Sept. 18, 1945. J. GEIER 2,385,071
METHOD OF FORMING CONTAINERS
Filed Dec. 3, 1942
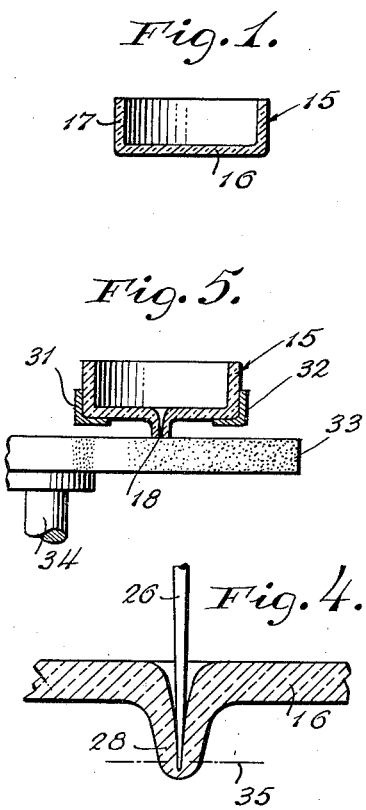
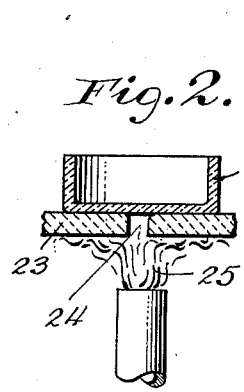
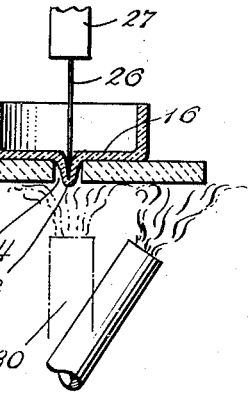
INVENTOR.
JAMES GEIER
BY
Oscar A. Geier
ATTORNEY Patented Sept. 18, 1945

2,385,071

UNITED STATES PATENT OFFICE 2,385,071

METHOD OF FORMING CONTAINERS

James Geier, Troy, N. Y.

Application December 3, 1942, Serial No. 467,697

2 Claims. (Cl. 49—79)

This invention relates to methods of shaping glass containers. The invention is particularly concerned with the manufacture of spirit levels of the circular type which are used on a large variety of instruments and machines, for example in the war industry and the like.

Circular spirit levels consist usually of a disc-shaped container comprising a cup-shaped body.

An object of the present invention is the provision of a method for the mass production of circular levels, the containers of which are of uniform size and shape.

Another object is to simplify and make less expensive the manufacture of circular levels and to produce levels the containers of which have strong, uniformly annealed walls.

Other objects of the present invention will become apparent in the course of the following specification.

The object of the present invention may be realized by using glass cups of regular form, which have no passages and by providing projecting tips in such cups, preferably by heating them and then employing a plunger for the formation of the tips. Then the cups are cooled and thereafter the ends of the tips are ground off so that passages are provided through which the cups may be filled. Finally, the open ends of the tips are sealed again by fusion.

The mass production of such cups may be attained by the use of a machine having a number of cup-carrying supports which are moved stepwise to subject the cups to a preliminary heating, to provide the tips in the cups and to anneal the cups.

The invention will appear more clearly from the following detailed description when taken in connection with the accompanying drawing showing, by way of example only, preferred embodiments of the inventive idea.

In the drawing:

Figures 1 to 5, inclusive, are diagrams illustrating a process of manufacturing the circular level shown in Figure 6;

Figure 1 is a section through a container cup for the disc level;

Figure 2 shows the pre-heating of the container cup;

Figure 3 illustrates the provision of a tip in the container cup;

Figure 4 shows on an enlarged scale the part of the container cup which is being provided with a tip;

Figure 5 illustrates the provision of a passage in the container cup; and

Figure 6 is a section through a completed circular level;

Figure 7 shows a container cup and illustrates the formation of a tip at a different location.

In accordance with the present invention, the prior art drawing process is dispensed with entirely, and the manufacture of level containers begins with a pre-fabricated glass cup 15 shown in Figure 1. This cup has a smooth flat bottom 16, which is of uniform thickness and has no passages. Annular walls 17 enclose the bottom 16 and are of the same thickness.

The cup 15 may be manufactured in any suitable manner well known in the art, and which does not constitute a part of the present invention. As already stated, the present invention is concerned with the provision of a passage 18 (Figure 5) through which the cup 15 may be filled with alcohol or any other suitable liquid 19 having a bubble 20 (Figure 6).

The cup 15 is preheated, preferably in two stages. For that purpose the cup 15 is preferably placed upon a disc 23 made of some heat insulating refractory material and having a guiding passage 24 situated below the center of the bottom 16 of the cup. The disc 23 is heated by flames 25 of a gas burner of the usual type (Figure 2).

When the bottom 16 has been made sufficiently soft by the heat, a plunger 26 held in a carrier 27 is pressed against the bottom 16 until a downwardly projecting tip 28 is formed. The plunger 26 is preferably turned while it presses against the bottom 16.

As shown in Figures 3 and 4, the plunger 26 merely forms a closed bulge or tip 28 in the bottom 16 and care should be exercised that the plunger 26 should not pierce the bottom 16 or make a hole therein.

The flame of a gas burner 30 is reduced preferably by being moved to a position shown in full lines in Figure 3, as soon as the plunger 26 is brought to bear against the bottom 16.

Then the plunger 26 is withdrawn and the cup 15 is annealed by being allowed to cool slowly and gradually.

After the cup 15 has been completely cooled, it is placed upon supports or shelves 31 and 32 (Figure 5) which engage opposite sides of the cup 15 and which are located at a predetermined distance from an abrasive wheel 33. The wheel 33 is carried by a shaft 34 driven by any suitable means not shown in the drawing. The distance between the supports 31 and 32 and the abrasive wheel 33 is less than the length of the tip 28, so that the lower end of the tip 28 is ground off by the wheel 33. Preferably, the end of the tip 28 is ground off to the extent of the line 35 shown in Figure 4, so that a very narrow passage 18 is formed (Figure 5) which communicates with the outside.

Then the cup 15 is removed from the supports 31 and 32 and is closed by a cover 36 (Figure 6) which is preferably somewhat curved and which is permanently fused to the side walls 17 of the cup. The cover 36 is fused by the usual means which are not further illustrated.

Then the cup 15 is placed under partial vacuum and a suitable liquid 19, preferably a fine grade alcohol, is introduced into the interior of the cup 15 through the passage 18 until a bubble 20 of the desired size is formed. Then the open end of the passage 18 is sealed by fusion, preferably by passing a flame quickly over the open end of the passage. This part of the process is known in the art and is not illustrated. The container of a completed level of the disc type, which is shown in Figure 6, has a small tip 38 which is considerably shorter than the original tip 28 shown in Figures 3 and 4.

It is apparent that since it is possible to provide any number of cups 15 of the same shape and size, the plunger 26 may be utilized for making tips 28 of the same size and form and that such tips may be cut off to the same extent by the use of the abrasive wheel 33. Thus the described method makes it possible to employ mass production methods for evacuating the cups 15, fusing the covers 36, filling the containers with liquid and sealing their passages 18.

Figure 7 shows a cup 15 having a tip 110 which is formed by a plunger 111 in a side wall 17 of the cup. It is apparent that the described cup-carrying supports of the machine may be easily adapted for the manufacture of tips located in a side wall of the cup.

It is to be understood that the invention is not intended to be restricted to any particular example, construction or method, as the same may be modified without departing from the spirit or scope of the claimed invention.

What is claimed is:

1. In the art of manufacturing a glass level partly filled with a fluid, the steps of heating a section of a prefabricated open top glass container by contact with a source of heat until said section is softened while preventing the heat from reaching other parts of the container and maintaining such parts in a substantially cold and solid state, removing said source of heat, applying outwardly directed pressure to said softened section until said section is formed into a hollow projecting tip, cooling the section and sealing the top of the container and removing the end of the tip to provide a passage for said fluid.

2. In the art of manufacturing a flat bottomed glass level partly filled with a fluid, the steps of heating a portion of the closed bottom of a prefabricated open top glass container by contact with a source of heat until said portion is softened while preventing the heat from reaching other parts of the container and maintaining such parts in a substantially cold and solid state, removing said source of heat, pressing said softened portion from the inside of said container while guiding the pressed part from the outside to form a hollow projecting tip, cooling said tip, and sealing the top of the container and removing the end of the tip to provide a passage for said fluid.

JAMES GEIER.